US00RE34186E

United States Patent [19]

Moen

[11] E Patent Number: Re. 34,186

[45] Reissued Date of Patent: Mar. 2, 1993

[54] COMBINED HEAD COVERING AND WIGLET

[76] Inventor: Leanna L. Moen, 2747 17th Avenue Ct., Moline, Ill. 61265

[21] Appl. No.: 774,578

[22] Filed: Oct. 10, 1991

Related U.S. Patent Documents

Reissue of:

[64] Patent No.: 4,804,003
Issued: Feb. 14, 1989
Appl. No.: 106,205
Filed: Nov. 17, 1987

U.S. Applications:

[63] Continuation of Ser. No. 741,035, Jun. 4, 1985, abandoned, which is a continuation of Ser. No. 493,281, May 16, 1983, abandoned.

[51] Int. Cl.[5] ..... A45D 8/40; A61G 5/00
[52] U.S. Cl. ..... 132/53; 132/274
[58] Field of Search ..... 132/53, 274

[56] References Cited

U.S. PATENT DOCUMENTS

| | | | |
|---|---|---|---|
| 2,142,201 | 1/1939 | Mayer | 132/274 |
| 2,279,867 | 4/1942 | Falk | 132/274 |
| 2,534,351 | 12/1950 | Herschensohn | 132/274 |
| 2,567,119 | 9/1951 | Naidor | 132/53 |
| 2,574,558 | 11/1951 | Graber et al. | 132/53 |
| 2,651,310 | 9/1953 | Selson | 132/53 |
| 3,295,536 | 1/1967 | Shaw et al. | 132/53 |
| 3,460,546 | 8/1969 | Abbot | 132/53 |
| 3,557,806 | 1/1971 | Blanchard | 132/53 |
| 3,782,396 | 1/1974 | Tamlinson | 132/53 |
| 3,910,292 | 10/1975 | Izzo | 132/53 |
| 4,599,749 | 7/1986 | Childs et al. | 132/53 |

FOREIGN PATENT DOCUMENTS

| | | | |
|---|---|---|---|
| 1248572 | 11/1960 | France | 132/53 |

*Primary Examiner*—Paul J. Hirsch

[57] ABSTRACT

A head covering is disclosed in combination with a small wig portion or hank of hair, whereby one who has lost even all one's natural hair may regain a natural appearance and even a variation thereof without employing subsitute parts.

3 Claims, 1 Drawing Sheet

COMBINED HEAD COVERING AND WIGLET

Matter enclosed in heavy brackets [ ] appears in the original patent but forms no part of this reissue specification; matter printed in italics indicates the additions made by reissue.

This is a continuation of Ser. No. 741,035 filed on June 4, 1985, now abandoned[.] *, which is a continuation of Ser. No. 493,281, filed on May 16, 1983, now abandoned.*

BACKGROUND OF THE INVENTION

This invention pertains generally to head coverings, and more particularly to head coverings combined with a hank of hair, natural or synthetic, protruding therefrom.

There are many causes for the loss of hair in both men and women. Mere increasing age often leaves its mark, the attendant loss of some or all of one's cranial covering being an all-too-common price that is paid for longevity. However, there are problems more serious than age that result in loss of hair, often prematurely, and sometimes quite suddenly. For example, chemotherapy patients, young and old alike, usually experience a partial, or even total, loss of natural hair in undergoing the treatments. Further, cranial surgery necessarily involves the deliberate removal of at least a portion of the patient's hair.

Whatever the cause of hirsute depletion, and whether it be permanent or only temporary for a matter of weeks or months, it is apparent that ego-satisfaction and the expectations of ordinary grooming require some sort of facade that will provide the appearance of a natural, abundant growth of hair. Wigs have often been procured in an attempt to satisfy this need, as have various hats, caps or thelike which have hair or hair-like strands mounted thereon. However, even the most expensive wigs are heavy, hot and "itchy", shortcomings which are all to well known as those of the head coverings provided with protruding hair.

DESCRIPTION OF THE PRIOR ART

Various wig structures have been generated in the prior art, ranging in detail from rather simple constructions to fairly complicated arrangements, the latter being exemplified by U.S. Pat. No. 3,521,648, issued to L. L. Capparilli, wherein the cap or supporting structure for the wig is composed of a plurality of sections or segments of differing elasticity in an attempt to fit one size of wig to a plurality of different-sized heads while maintaining a close fit over the entire scalp to effect a natural appearance for the hair attached to and covering the wig cap.

As workers in this art have discovered over the years, it is a basic rule that the greater the portion of the head that one attempts to cover with "false" hair, the greater is the difficulty that one encounters in trying to achieve a look of natural hair, and the more complicated the resulting structures often become. The foregoing patent to Capparilli is illustrative of one degree of such complication.

U.S. Pat. No. 3,460,546 to Abbott is exemplary cf another approach to the problem, wherein a triangular scarf or the like is provided with rather large fore and aft "swatch-like" arrangements of hair in amounts sufficient "to effectively mask the natural hair of the wearer". While the Abbott structure is, thus, relatively simple, the very nature of the scarf-like body portion (viz, the relatively small percentage of the wearer's head covered by a scarf) necessitates the use of correspondingly larger portions or "swaths" of hair; as discussed above, this is an undesirable condition, since it increases the difficulty one encounters in attempting to achieve a look of natural hair. While the front or leading edge of the Abbott scarf "is tensioned over the top of the head" by tying the ends under the chin, the problem is compounded in Abbott by virtue of the relative looseness of the rear and lower scarf portions, as well as by the fact that the rear swaths of hair are secured to the scarf at positions toward the center, or deeply inboard, of the scarf, resulting in an absence of control over a large extent of the swath of hair attached thereto.

Still another approach is that of U.S. Pat. No. 2,574,558 to Graber, in which "a mass of false hair curls adapted to be worn over the natural hair above the forehead" is "held in position by a band encircling the head". A cooperating wrap-around head covering includes a connecting strip along its front edge for detachable connection with a singular strip "at the rear of the false curls", there being respective cooperating snap fasteners or the like on the two connecting strips. The Graber patent emphasizes the use of such mass of false hair curls to cover the natural hair above the forehead, distinguishing this construction from the admitted prior art in which a scarf or turban itself completely covers the natural hair. That is to say, the scarf or the like of Graber deliberately covers less than all of the natural hair, with the hair above the forehead being covered by the mass of false curls, rather than by the scarf. In fact, the natural hair above the forehead is covered in Graber even in the total absence of the scarf or other headcovering. Suffice it to say that the head covering of Graber is not inclusive of all parts of the natural hairline; the hair above the forehead being covered by only the false hair.

The boudoir cap of U.S. Pat. No. 2,889,557 to Blair includes a substantially complete peripheral ring of false hairs, which "when matching the hair of the wearer blend with the wearer's hair" (italics added). Obviously, then, neither the boudoir cap nor the peripheral false hair thereon is intended to cover all the natural hair of the wearer; neither is intended to enclose or surround the entire natural hairline.

A second Blair patent, U.S. Pat. No. 2,897,511, is of general interest with respect to this subject matter, showing generally a fringe of hair to be attached to a ladies's hat or to a man's hat, for covering the natural hair of the wearer, this patent being primarily concerned with magnetic means for releasably attaching the fringe to the hat.

All of the foregoing prior art patents relating to head coverings with peripherally-attached hair are disclosed as being means for covering the natural hair, so as to hope to provide a neat and attractive appearance even when the natural hair is not properly made-up or arranged. None contemplates the provision of a natural appearance where there is a total or partial absence of natural hair on the wearer.

SUMMARY OF THE INVENTION

In accordance with the present invention, there is provided a head covering which is designed to entirely encompass or enclose the natural hairline of the wearer, even in the absence of natural hair, with a relatively small hank of hair, natural or otherwise, being attached to the inner surface of such head covering at the front thereof, the hank of hair protruding from under the head covering with the appearance of natural hair in place on the wearer's forehead. The head covering of this invention is preferably formed of a soft, porous, stretch fabric which is easily laundered and dried for immediate re-use, and is of such dimensions as to resiliently grip the head at or outside the normal hairline and providing a loose, light weight, comfortable fit over the bald scalp circumscribed by such hairline. An important facet of the present invention is the achievement of a desirable conforming fit without the use of constricting bands or rings.

DESCRIPTION OF A PREFERRED EMBODIMENT

Figure 1:
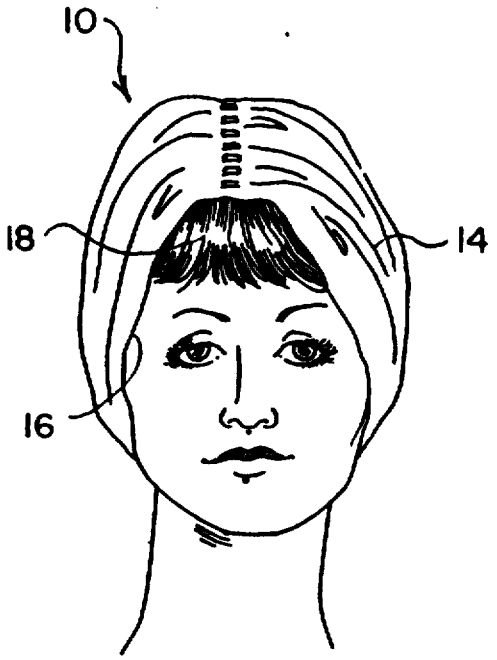
FIG. 1 is a front elevation view of the combined head covering of the present invention, as might be worn by a chemotherapy patient or other bald person, showing the protruding hank of hair with the curl thereof extending downwardly over a portion of the wearer's forehead.
Figure 2:
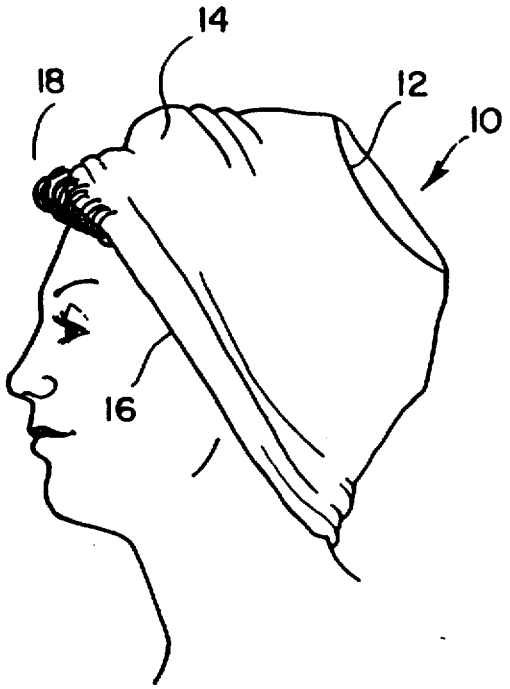
FIG. 2 is a side elevation view of the combination head covering of the present invention, similar to FIG. 1, but with a curl of the hank of hair extending upwardly and over the adjacent portion of the head covering.

Referring now to FIG. 1, the combined head covering and wiglet as indicated generally at 10, comprising a body portion including a central portion 12 (see FIG. 2) surrounded by a circumferentially-depending side portion 14 terminating in a circumferential rim portion 16. The head covering is preferably formed of a soft, porous stretch fabric, so as not to irritate the bald (or nearly so) scalp of the wearer, as well as to provide a comfortably cool covering.

The width of depending side portion 14 between central portion 12 and circumferential rim 16 is sufficiently large to circumscribe or encompass the normal hairline of the wearer, and the circumference of rim portion 16 is sufficiently small to establish in view of the stretch nature of the fabric, a resilient peripheral grip on the wearer's head substantially outside or without the wearer's normal hairline.

The residuum of the head covering other than the aforementioned circumferential rim portion lies within or inside the normal hairline and fits loosely over the scalp.

A small piece of hank of hair 18 is attached to the head covering, as will be described, and Protrudes from underneath the front portion thereof. In FIG. 1 the curl of the hank of hair extends downwardly over the forehead of the wearer, while in FIG. 2 this same hank of hair 18 extends up over the rim 16 of the head covering. This alternative arrangement may be achieved by means of the releasable connecting means shown in FIGS. 3 & 4.

Figure 3:
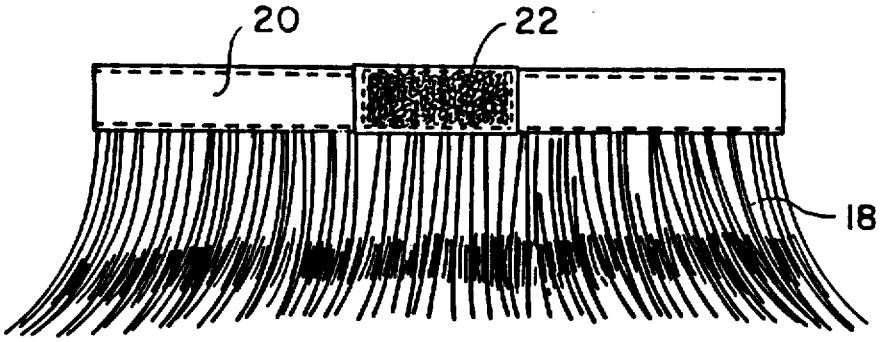
FIG. 3 is a detail view of the hairpiece of the present invention.
Figure 4:
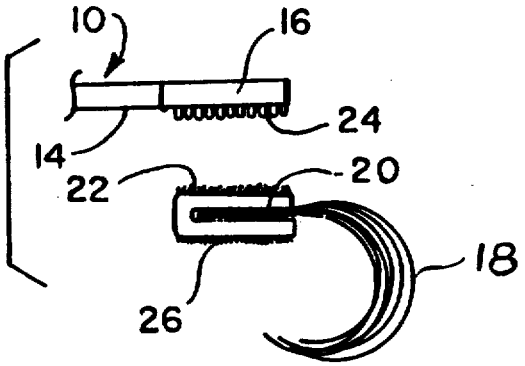
FIG. 4 is a detail view illustrating alternate means of attachment between the hair portion and the head covering.

FIG. 3 shows the hank of hair 18 secured (as by stitching) to a strip 20 of cloth or the like, which may be doubled over the strands of hair and then stitched together, as indicated in FIG. 4.

Also stitched or otherwise suitably secured to at least a portion (preferably central) of strip 20 is a quick-release securing means 22, such as that sold under the tradename Velcro, which cooperates with mating member 24 of suitably matching proportions, stitched or otherwise secured to the inner face of rim 16 at the front of the head covering 10. As is well understood, when mating means 22 and 24 are pressed together in intimate contact, the two hold to each other in a secure but easily releasable (by pulling them apart) relationship.

For the curl of the hairpiece 18 to extend down over the wearer's forehead, the parts are related as shown in FIG. 4, with releasable securing means 22 engaging matching member 24 on the head covering rim 16. If, on the other hand, the wearer should prefer that the curl of the hairpiece 18 extend upwardly over the rim of the head covering, the hank of hair 18 shown in FIG. 4 can be turned upside down, presenting quick-release fastening member 26 to cooperating member 24, with the hair 18 now curling up (in FIG. 4) and over the rim 16.

The invention has been described in some detail, and particularly in connection with a preferred embodiment thereof, disclosed as suitable for one who has lost one's hair through chemotherapy. However, it will be apparent to those skilled in this art that various modifications may be made in accordance with the invention taught herein. Hence, the invention is not to be considered as being limited to the particular details given in connection with this description of a preferred embodiment, but only insofar as limited by the appended claims.

What is claimed is:

1. A head covering comprising: a body portion formed of a soft, porous stretch fabric, said body portion including a preformed inherent, circular central portion surrounded by a preformed inherent continuous circularly-extended side portion terminating in a circular rim portion integral with and not originally separate from said body portion, the width of said side portion between said central portion and said rim portion being sufficiently large to cause said rim portion to circumscribe the head of the wearer and to be below the normal hairline of the wearer, the circumference of said rim portion being sufficiently small to establish a resilient peripheral grip about the head of the wearer to fully support the residuum of said body portion fitting loosely on and completely over the wearer's head without additional support, and the circumferential line of said rim portion extended substantially parallel the circumferential line formed by the junction of said central portion with said side portion; the formation pf said head covering such that when embracing the head of a wearer, the rim portion normally is disposed from high on the forehead to low on the back of the neck of the wearer, and said side portion is adapted to have a substantially frusto-conical shape in side elevation;

and further wherein at least one gathering means is secured to said side portion for gathering a portion of said side portion, said gathered portion beginning at said rim portion and extended normal thereto.

2. A combined head covering and wiglet comprising: a body portion formed of a soft, porous fabric, said body portion including a preformed inherent, circular central portion surrounded by a preformed inherent continuous circularly-extended side portion terminating in a circular rim portion integral with and not originally separate from said body portion, the width of said side portion between said central portion an said rim portion being sufficiently large to cause said rim portion to circumscribe the head of the wearer and to be below the normal hairline of the wearer, the circumference of said rim portion being sufficiently small to establish a resilient peripheral grip about the head of the wearer to fully support the residuum of said body portion fitting loosely on and completely over the wearer's head without additional support, the formation of said head covering such that when embracing the head of a wearer, the rim portion normally is disposed from high on the forehead to low on the back of the neck of the wearer, and said side portion is adapted to have a frusto-conical shape in side elevation;

first fastening means secured to said rim portion;

a hank of hair affixed to a shortened strip of material; and second fastening means affixed to said strip of material whereby said strip can be removably fastened to said first fastening means such that said hank of hair extends outwardly in an exposed condition beyond said rim portion.

3. The combined head covering and wiglet of claim 2, and further wherein said second fastening means is affixed to opposed sides of said strip whereby said strip can reversibly removably fastened to said first fastening means.

* * * * *